(12) United States Patent
Steckelberg et al.

(10) Patent No.: US 6,991,661 B2
(45) Date of Patent: Jan. 31, 2006

(54) DYE MIXTURE OF WATER SOLUBLE FIBER-REACTIVE DYES, METHOD FOR THEIR PRODUCTION AND THE USE THEREOF

(75) Inventors: Joachim Steckelberg, Brunsbüttel (DE); Christian Schumacher, Kelkheim (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 102 days.

(21) Appl. No.: 10/343,263

(22) PCT Filed: Jul. 25, 2001

(86) PCT No.: PCT/EP01/08595

§ 371 (c)(1),
(2), (4) Date: Feb. 24, 2003

(87) PCT Pub. No.: WO02/10289

PCT Pub. Date: Feb. 7, 2002

(65) Prior Publication Data

US 2003/0204919 A1 Nov. 6, 2003

(30) Foreign Application Priority Data

Jul. 29, 2000 (DE) .......................... 100 37 075

(51) Int. Cl.
*D06P 1/84* (2006.01)
*C09B 67/24* (2006.01)

(52) U.S. Cl. ......................................................... 8/549
(58) Field of Classification Search ............... 8/546, 8/549, 917, 918, 437, 924, 641
See application file for complete search history.

(56) References Cited

U.S. PATENT DOCUMENTS

| | | | | |
|---|---|---|---|---|
| 4,581,036 A | | 4/1986 | Opitz et al. ................ 8/527 |
| 5,445,654 A | | 8/1995 | Hussong et al. ............ 8/546 |
| 5,460,631 A | * | 10/1995 | Hoppe et al. ............... 8/549 |
| 5,496,381 A | * | 3/1996 | Russ et al. ................. 8/549 |
| 5,512,061 A | | 4/1996 | von der Eltz et al. ....... 8/480 |
| 5,548,071 A | | 8/1996 | Deitz et al. .............. 534/612 |
| 5,611,821 A | | 3/1997 | Huang et al. ............... 8/549 |
| 5,725,641 A | | 3/1998 | MacLeod ................. 106/31.5 |

FOREIGN PATENT DOCUMENTS

| | | |
|---|---|---|
| DE | 4 320 632 | 6/1994 |
| DE | 4306432 | 4/1996 |
| EP | 0 158 233 | 10/1985 |
| EP | 0625551 | 11/1994 |
| EP | 0629667 | 12/1994 |
| EP | 0 644 239 | 3/1995 |
| EP | 0668328 | 8/1995 |
| EP | 668328 * | 8/1995 |
| EP | 0626429 | 8/1996 |
| JP | 58-160362 | 9/1983 |
| KR | 94-2560 | 3/1994 |
| WO | 94/18381 | 8/1994 |

\* cited by examiner

*Primary Examiner*—Margaret Einsmann
(74) *Attorney, Agent, or Firm*—Connolly Bove Lodge & Hutz LLP

(57) ABSTRACT

Water-soluble fiber-reactive dyes, preparation thereof and use thereof

Dye mixtures which include the dyes of the general formula (1) and dyes of the general formula (2):

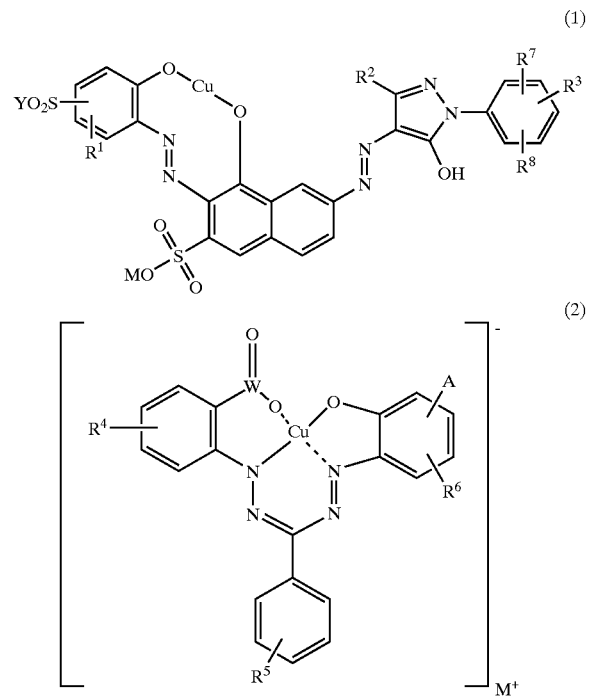

their preparation and their use for dyeing or printing hydroxyl- and/or carboxamido-containing material, preferably fiber material.

26 Claims, 1 Drawing Sheet

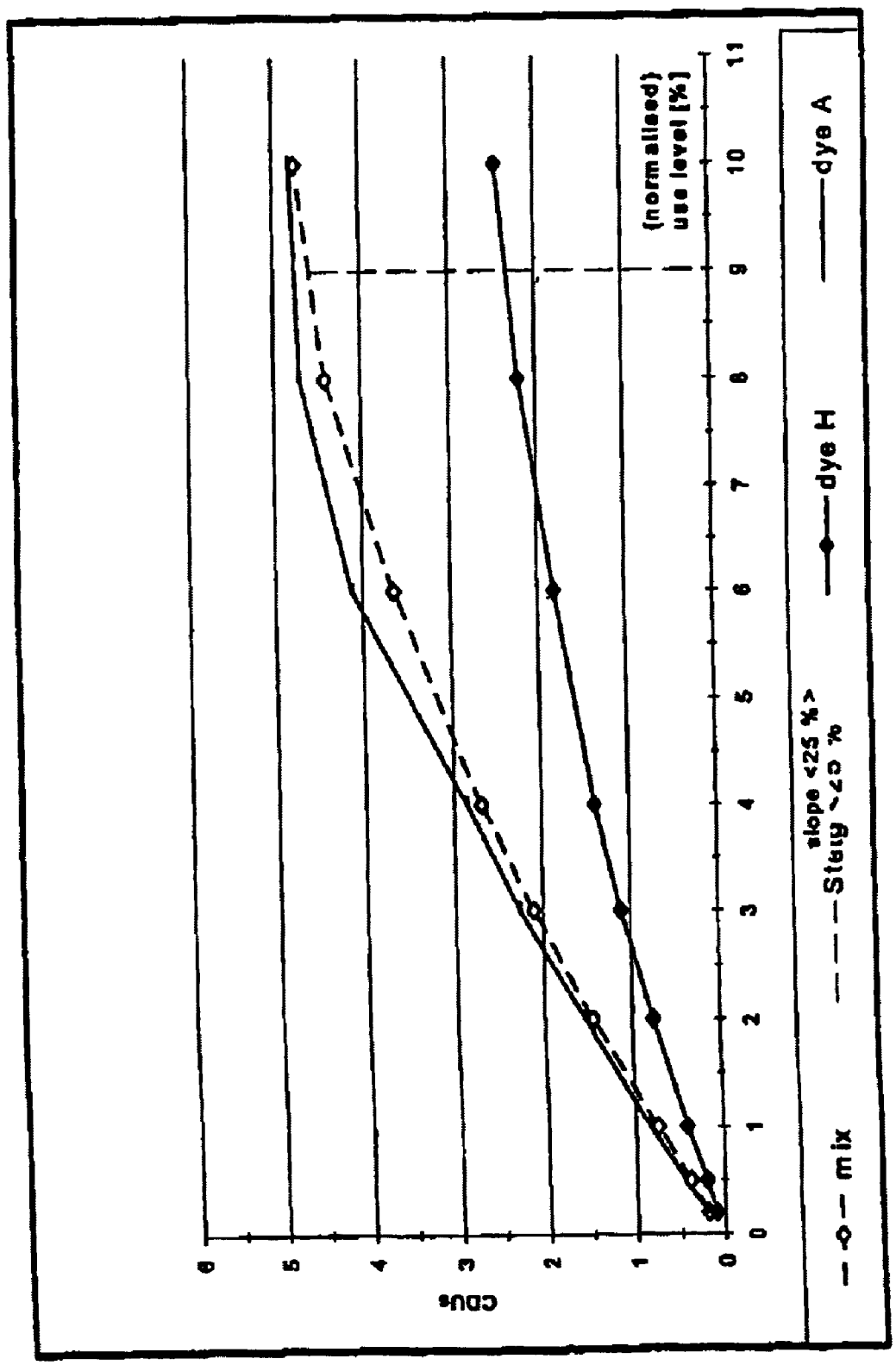

DYE MIXTURE OF WATER SOLUBLE FIBER-REACTIVE DYES, METHOD FOR THEIR PRODUCTION AND THE USE THEREOF

This invention relates to the technical field of fiber-reactive dyes.

Numerous fiber-reactive dye mixtures are known, for example from U.S. Pat. Nos. 5,445,654 and 5,611,821, and also from Korean patent 94-2560 and the Japanese reference Sho 58-160 362, for producing black dyeings on hydroxyl- and/or carboxamido-containing fibers, such as cellulosic fibers in particular. EP-A 158 233 describes numerous mixtures of fiber-reactive dyes, in each of which one dye component is employed as a shading component.

However, these dye mixtures have certain application defects, for example an excessive dependence of the color yield on changing dyeing parameters in the dyeing operation, or an inadequate or unlevel build-up on cotton, good build-up resulting from the ability of a dye to provide a stronger dyeing when used in a higher dye concentration in the dyebath. One consequence of these defects can be poor reproducibilities for the dyeings which are obtainable.

However, it is especially important to obtain dyeings having a good color yield, ie dyeings whose depth of shade is very high in relation to the amount of dye used, for example owing to a high absorbance and owing to good dyeing characteristics of this dye, for example a high affinity and a high fixation yield. When mixtures of dyes having a certain color yield are used, it is the rule that the color yield of these mixtures of dyes is the sum total of the color yields of the individual dyes, which is why the color yield of a mixture of, for example, two dyes will be lower than the color yield obtained when the dye having the larger color yield property is used as the only dye but in the total amount of the two individual dyes. This also applies to the service fastnesses such as the light, wash, hotpress and chlorine fastnesses for example. With these fastnesses, moreover, there is often a negative synergy effect known as catalytic fading, so that fastnesses of mixtures can be less than those of the individual dyes.

The present inventors have now surprisingly, found that, the color strength of the hereinbelow described dye mixtures according to the present invention is surprisingly higher than the sum total of the color strengths afforded by the individual dyes in the mixture. This positive synergistic effect also shows itself in improved build-up characteristics for the mixture according to the present invention compared with that of the individual dyes in the mixture and also in fastnesses which in some instances are superior to the average of the individual fastnesses.

The present invention accordingly provides dye mixtures which include at least one dye of the general formula (1) and at least one dye of the general formula (2):

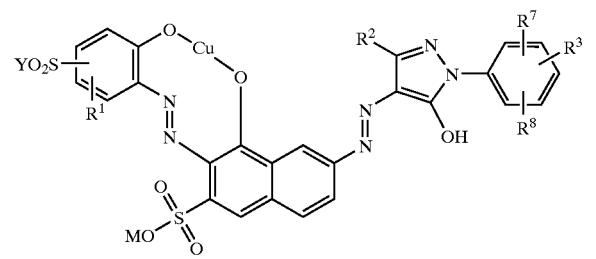

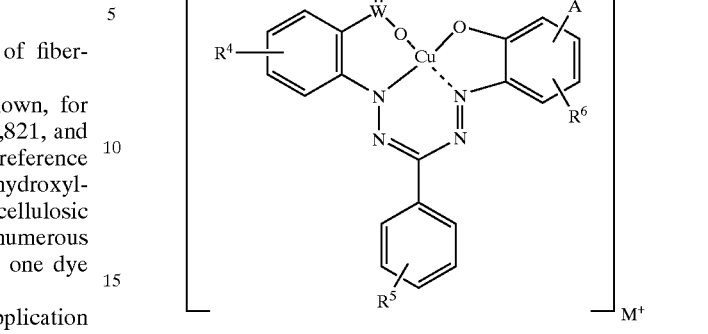

where

M is hydrogen or an alkali metal, an ammonium or the equivalent of an alkaline earth metal ion;

Y is vinyl or is a moiety of the formula $CH_2CH_2Z$, where

Z is an alkali-eliminable moiety such as for example chloro, acetyl, phosphato, thiosulfato and more preferably sulfato;

$R^1$ is hydrogen or $C_1$–$C_4$ alkyl, such as methyl, ethyl, n-propyl, i-propyl, n-butyl, i-butyl, sec-butyl, $C_1$–$C_4$ alkoxy, such as methoxy, ethoxy, propyloxy or butyloxy, sulfo, bromo, chloro, preferably methyl or methoxy;

$R^2$ is hydrogen or $C_1$–$C_6$-alkyl, such as methyl, ethyl, n-propyl, i-propyl, n-butyl, i-butyl, sec-butyl, pentyl or hexyl, carboxyl, carboxyalkyl, for example carboxymethyl or carboxyethyl, preferably carboxyl or methyl;

$R^3$ is hydrogen, sulfo or $SO_2Y^1$, where $Y^1$ has one meaning of Y;

$R^4$ is hydrogen or sulfo;

$R^5$ has one meaning of $R^4$ or is methyl, carboxyl or $SO_2Y^2$, where $Y^2$ has one meaning of Y and preferably is $CH_2CH_2Cl$;

$R^6$ has one meaning of $R^4$;

$R^7$ is hydrogen, alkyl, sulfo or chloro;

$R^8$ has one meaning of $R^7$;

W is a carbon or —SO—;

A is $SO_2Y^3$, where $Y^3$ has one meaning of Y, or else A is a moiety of the general formula (3):

where

* denotes the bond to formazan and

B is a moiety of the general formulae (4), (5), (6) or (7):

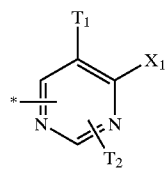

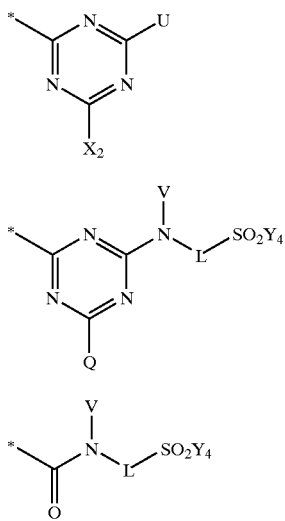

where
* is the bond to N in the formula (3)
U is a 5- or 6-membered N-attached heterocyclic ring which may be substituted by a thio or oxo group, preferably U is morpholine, or else a group of the general formula (8):

where
E is hydrogen, unsubstituted or methoxy-, hydroxyl-, sulfato-, sulfo- or chloro-substituted $C_1$–$C_4$-alkyl or is phenyl which may be substituted by one or 2 substituents selected from the group consisting of chlorine, nitro, acetylamino, sulfo, hydroxyl, carboxyl, $C_1$–$C_4$-alkanoyl, $C_1$–$C_4$-alkoxy and $C_1$–$C_4$-alkyl, preferably is hydrogen, phenyl, 4-chlorophenyl, 3-sulfophenyl, methyl, 2-hydroxyethyl, 2-sulfoethyl, 2-hydroxyethyl, 2-sulfatoethyl;

G has one of the meanings of E or is cyano and preferably hydrogen;

L is phenylene or naphthyl which may each be substituted by up to two substituents selected from the group consisting of chloro, bromo, hydroxyl, $C_1$–$C_4$-alkoxy, especially methoxy, $C_1$–$C_4$-alkyl especially methyl, ethyl, sulfo, cyano; or L is $C_2$–$C_6$-alkylene, which may be interrupted by 1 to 2 hetero groups, such as for example oxo, thio, amino, $C_1$–$C_4$-alkylamino; L is preferably phenylene, ethylene, propylene, 3-oxopentylene;

Q is fluorine, chlorine, $C_1$–$C_4$ alkoxy, cyanamido, amino, $C_1$–$C_4$-alkylamino, dialkylamino, piperazine, morpholine or a group of the formula (9a) or (9b):

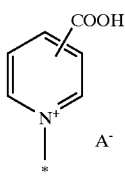

where A⁻ is fluoride, chloride or the equivalent of a sulfate ion;
V has one of the meanings of E and preferably is hydrogen, methyl, phenyl or sulfophenyl;
$T^1$ is hydrogen, fluorine or chlorine;
$T^2$ is hydrogen, fluorine or chlorine, subject to the proviso that $T^1$ and $T^2$ are not both hydrogen;
$X^1$ is fluorine or chlorine; and
$X^2$ has one meaning of $X^1$.

In general, the dye of the general formula (1) and the dye of the general formula (2) are present in the mixture in a mixing ratio of 90:10% by weight to 10:90% by weight and preferably in a ratio of 80:20% by weight to 20:80% by weight. More preferably, the two dyes are present in the dye mixture according to the present invention in a ratio of 65:35 to 35:65% by weight.

The dye mixtures of the present invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium citrate and disodium hydrogenphosphate, or small amounts of siccatives or, when they are present in a liquid, aqueous solution (including the presence of thickeners of the type customary in print pastes) they may also include substances which ensure a long life for these preparations, for example mold preventatives.

In general, the dye mixtures of the present invention are present as dye powders containing 10% to 80% by weight, based on the dye powder or the preparation, of an electrolyte salt which is also known as a standardizing agent. These dye powders may additionally include the aforementioned buffer substances in a total amount of up to 10% by weight, based on the dye powder. When the dye mixtures of the present invention are present in aqueous solution, the total dye content of these aqueous solutions will be up to about 75% by weight, for example between 5 and 75% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight and preferably up to 2% by weight.

Dyes of the general formula (1) are known and can be synthesized as described in U.S. Pat. No. 5,725,641, EP-A 668328 and DE 4306432. For instance, common diazotizing and coupling reaction can be used to construct the bisazo compounds and subsequently, in a manner familiar to one skilled in the art, the dyes of the formula (1) according to the present invention prepared by coppering: 2-amino-8-hydroxy-6-sulfonaphthalene (1a):

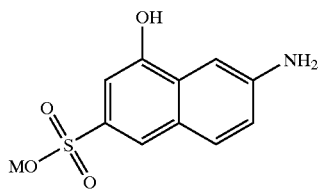

is diazotized with sodium nitrite in a hydrochloric acid medium and coupled onto a compound of the formula (1b):

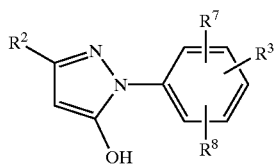

to obtain the corresponding monoazo compound of the formula (1c):

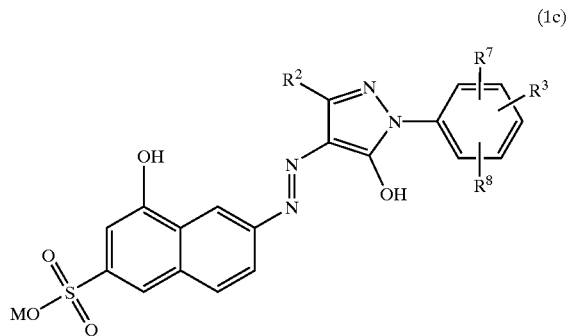

Diazotization of the aniline compound (1d) with sodium nitrite in hydrochloric acid solution:

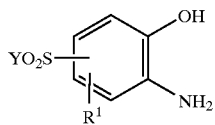

and coupling onto the compound of the formula (1c) gives the bisazo compound (1e):

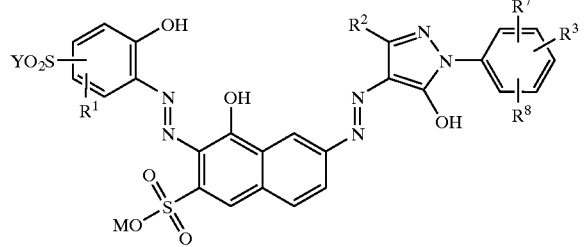

which is converted into the compound of the formula (1) by coppering with a copper salt at elevated temperature and a pH between 5 and 7.

Dyes of the general formula (2) are known from the patent documents EP-A 629 667, EP-A 625551, EP-A 626429, DE-4320632 which corresponds to U.S. Pat. No. 5,460,631, WO 9418381 and EP-A-644239 which corresponds to U.S. Pat. No. 5,496,381. For instance, a compound of the general formula (2a), where W and $R^4$ are each as defined above, can be diazotized in a mineral acid medium at 0–10° C. by addition of sodium nitrite and the resulting diazonium salt can be reduced to the hydrazine (2a) in a manner familiar to one skilled in the art. The reducing agent used is preferably hydrogen in the presence of a transition metal catalyst:

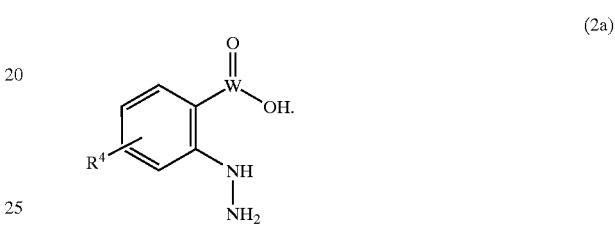

This hydrazine (2a) is then reacted with an appropriate substituted benzaldehyde to form a hydrazone (2b);

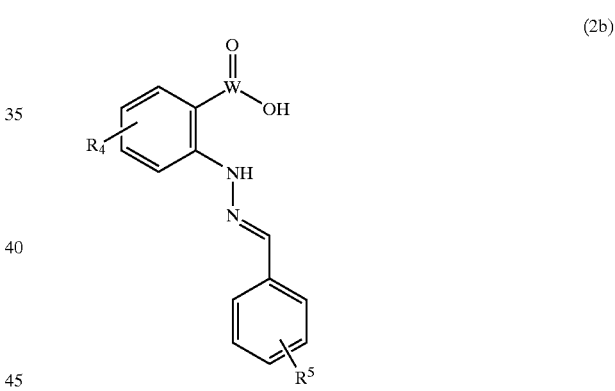

where $R^5$ is as defined above. The hydrazone of the formula (2b) reacts with diazonium salts in the presence of copper salts to form the corresponding formazans. For instance, reaction of (2b) with the diazonium salt (2c') for A equal to $SO_2Y^3$, where $Y^3$ is as defined above, and reaction of (2b) with the diazonium salt (2c") for A equal to a moiety of the general formula (3) in the compound (2) to be prepared, in the presence of copper at a pH of 4–9, give respectively the formazan (2d') and the formazan (2d");

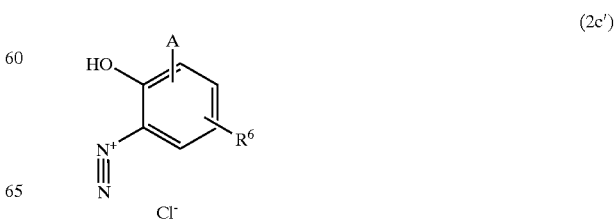

-continued (2c″)
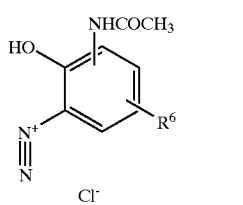

(2d′)

(2d″)

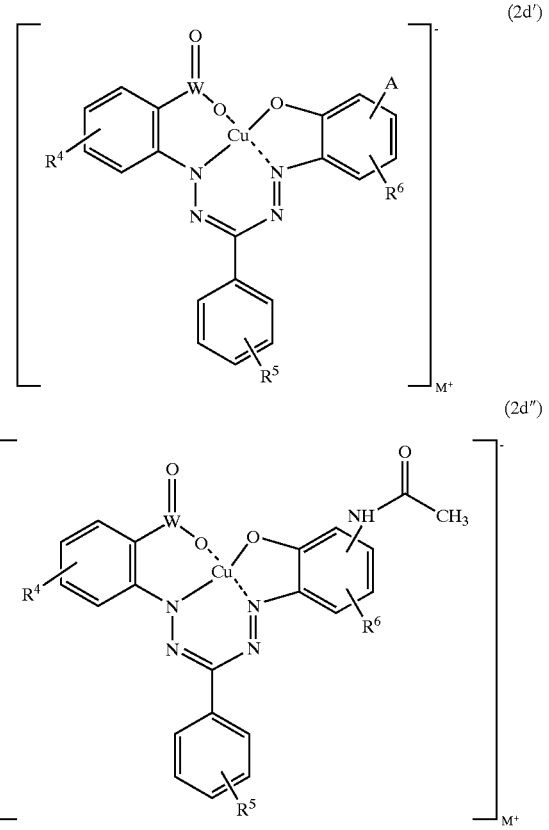

Alkaline hydrolysis of (2d″) at elevated temperature gives the free amine (2e) which can be reacted with fiber-reactive systems such as for example trifluorotriazine, trifluoropyrimidines: or trichlorotriazine.

(2e)
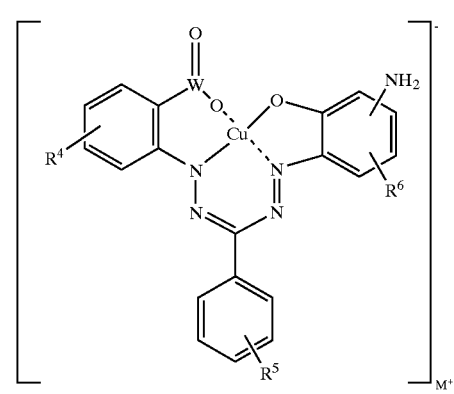

A substitution reaction familiar to one skilled in the art is finally used to introduce the radical B of the aforementioned meaning into the compound of the formula (2e), and the thus obtained compound of the general formula (2) is isolated in a conventional manner by salting out or spray drying.

The dye mixtures of the present invention are preparable in a conventional manner, for instance by mechanically mixing the individual dyes, which are present in solid or in liquid form, in the requisite proportions.

The dye mixtures of the present invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions of the dye mixtures of the present invention that are obtained in the synthesis of the azo compounds, if appropriate after addition of a buffer substance and if appropriate after concentrating or diluting, can be used directly as liquid preparation for dyeing.

The present invention thus also relates to the use of the dye mixtures of the present invention for dyeing or printing these materials, or rather to processes for dyeing or printing these materials in a conventional manner, by using a dye mixture of the present invention as colorant. The materials are preferably employed in the form of fiber materials, especially in the form of textile fibers, such as woven fabrics or yarns, as in the form of hanks or wound packages.

BRIEF DESCRIPTION OF THE FIGURE

The FIGURE illustrates the color strength of the dyeings obtained, measured in terms of color density units, which were plotted in against the respective individual dyeings of the dyes A and H.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the present invention can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good color yields which are improved compared with the individual dyes. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the present invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dye mixtures of the present invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the present invention have bright hues; especially the dyeings and prints on cellulose fiber materials have good lightfastness and very good wetfastnesses, such as wash, milling, water, seawater, crossdyeing and acidic and also alkaline perspiration fastness properties, also good fastness to hotpressing and rubbing.

Furthermore, the dye mixtures of the present invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colorists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalene-sulfonic acid or on the basis of a reaction product of for example stearylamine with ethylene oxide. For instance, the dye mixture of the present invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the present invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the present invention is very good, they can also be used with advantage in customary continuous dyeing processes. The color strength of the dye mixtures of the present invention is very high.

The dye mixtures of the present invention dye the materials mentioned, preferably fiber materials, in gray to bluish black shades.

The examples hereinbelow serve to illustrate the present invention. They are preparable in an inventive manner by mechanically mixing the individual dyes in solid or liquid form. Parts and percentages are by weight, unless otherwise stated. The compounds described in the examples in terms of a formula are in some instances indicated in the form of the free acids; in general they are prepared and isolated in the form of their salts, preferably sodium or potassium salts, and used for dyeing in the form of their salts. The dye mixtures of the present invention have very good application properties and provide on the materials mentioned in the description, in particular cellulosic fiber materials, by the application methods customary in the art for dyeing and printing, preferably by the application and fixing methods customary in the art for fiber-reactive dyes, strong dyeings and prints having good fastness properties and particularly good tainting performance especially with regard to polyester in continuous dyeing by the pad-steam process.

EXAMPLES 1. (a) 23.9 parts of 2-amino-8-hydroxy-6-sulfonaphthalene are dissolved in 200 parts of water by addition of sodium carbonate to give a neutral solution. It is admixed with 6.9 parts of sodium nitrite. The solution is added dropwise to a mixture of 100 parts of ice and 100 parts of half-concentrated hydrochloric acid. This is followed by 1 hour of stirring before the excess nitrite is destroyed with urea.

1. (b) 28.5 parts of 1-(4-sulfo)phenyl-3-carboxypyrazol-5-one are dissolved in 100 parts of water at pH 6. The diazonium salt of (a) is added dropwise while a pH between 4–7 is maintained by addition of sodium carbonate.

1. (c) 34 parts of 2,5-dimethoxy-4(β-sulfatoethylsulfonyl) aniline are dissolved in 200 parts of water by addition of sodium carbonate to give a neutral solution. It is admixed with 6.9 parts of sodium nitrite. The solution is added dropwise to a mixture of 100 parts of ice and 100 parts of half-concentrated hydrochloric acid. This is followed by 1 hour of stirring before the excess nitrite is destroyed with urea.

The diazonium salt solution of (c) is then added dropwise to the reaction solution of (b) while the pH is maintained between 4 and 7 by addition of sodium carbonate. This is followed by 1 hour of stirring, addition of 14 parts of copper chloride and heating at 100° C. for 3 days during which the pH is maintained between 5 and 7 by addition of sodium carbonate. The dye is precipitated by addition of ethanol at room temperature and isolated by filtration. This affords 110 parts of the dye (A):

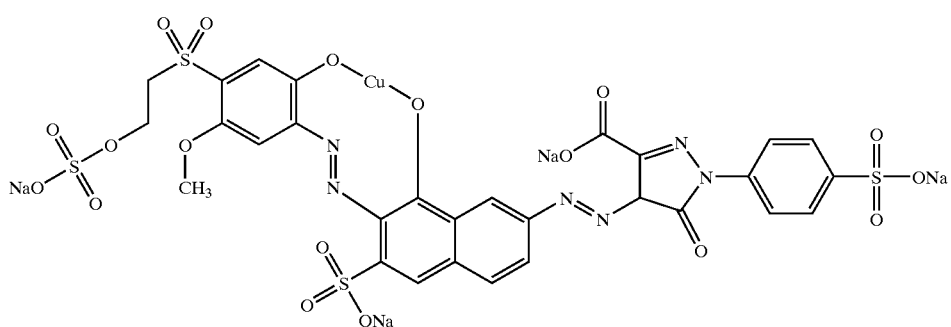

(A)

The following dyes which conform to the general formula (1) were prepared in a similar manner:

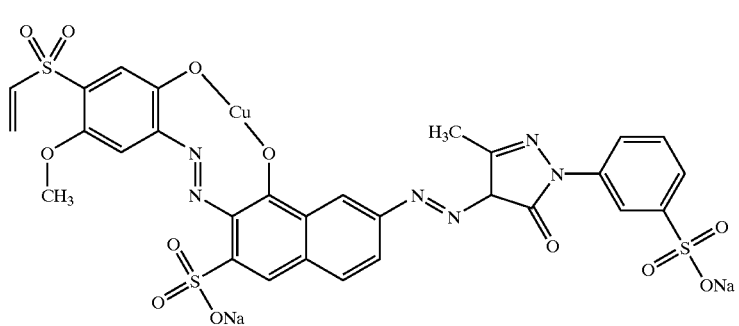

(B)

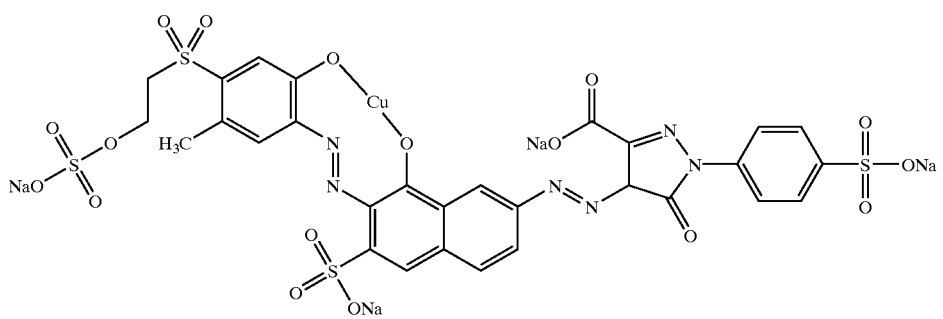

(C)

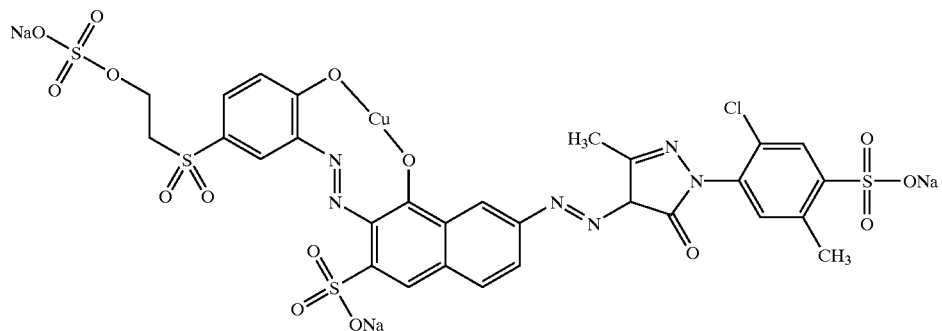
(D)
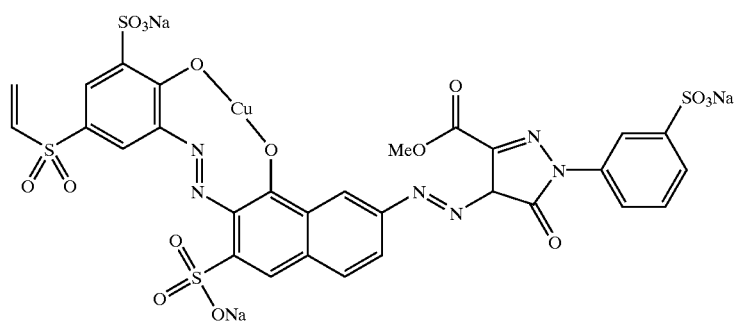
(E)
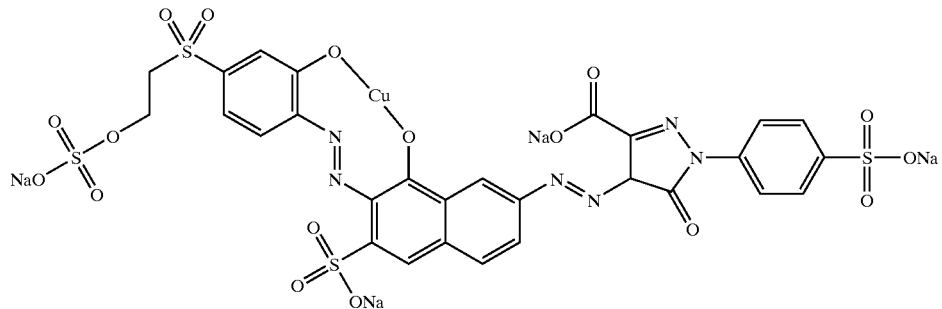
(F)
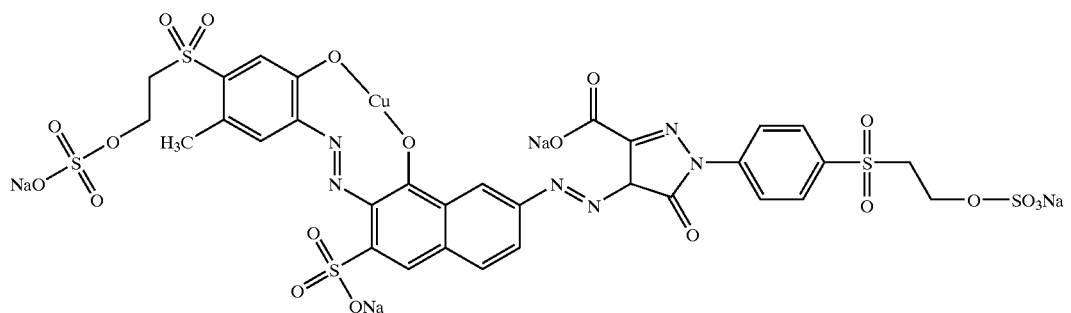
(G)

2. (a) 3-Amino-4-carboxyphenylsulfonic acid is diazotized in hydrochloric acid at 0–10° C. by addition of sodium nitrite and the resulting diazonium salt is reduced to the hydrazine (a) with hydrogen in the presence of a transition metal catalyst.

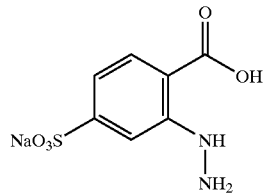
(a)

2. (b) This hydrazine is then reacted with an appropriately substituted benzaldehyde at 20–40° C. in water to give the hydrazone (b).

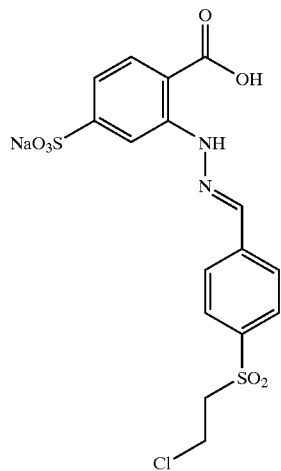
(b)

2. (c) Reaction of (b) with (c) in the presence of copper at pH 4–9 gives the formazan (d)

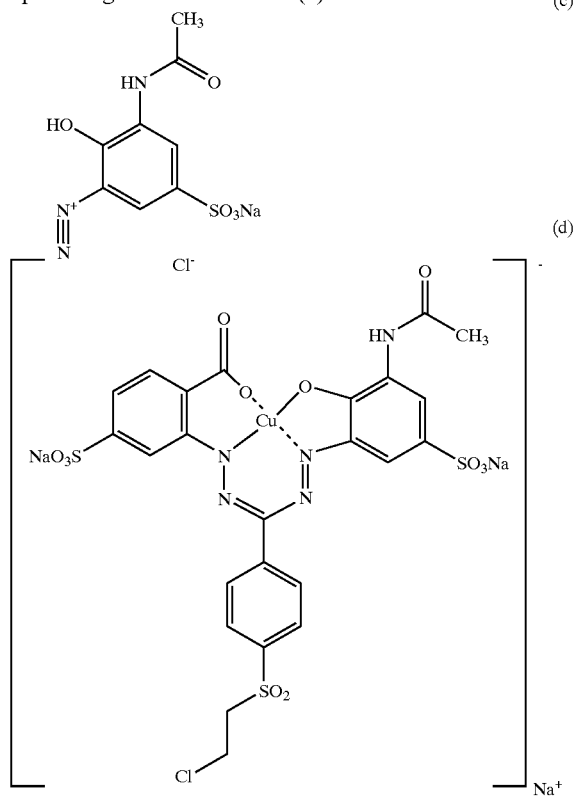
(c)
(d)

Alkaline hydrolysis of (d) at elevated temperature gives the free amine (e).

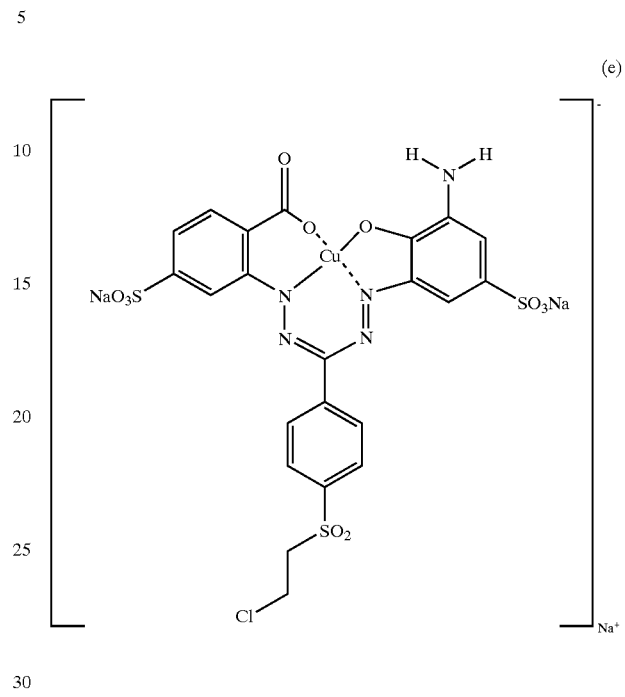
(e)

Reaction of (e) with trichlorotriazine at 0–20° C. gives the corresponding dichlorotriazinyl compound which reacts with N-ethyl-3-β-vinylsulfonylaniline at room temperature to form the dye (L) which is in accordance with the present invention.

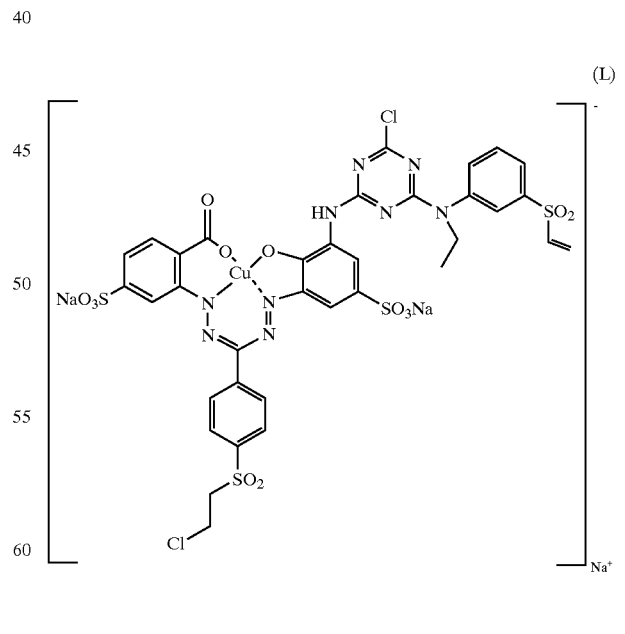
(L)

The following dyes which conform to the general formula (2) were prepared in a similar manner:

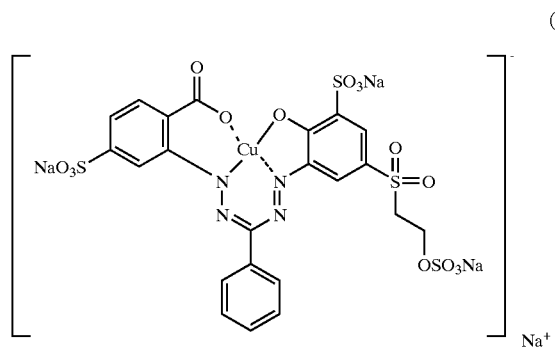
(H)
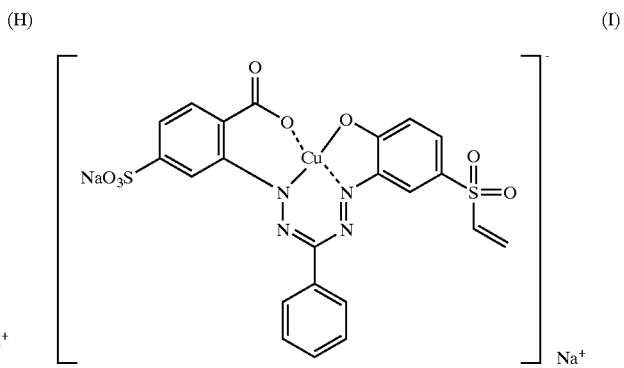
(I)
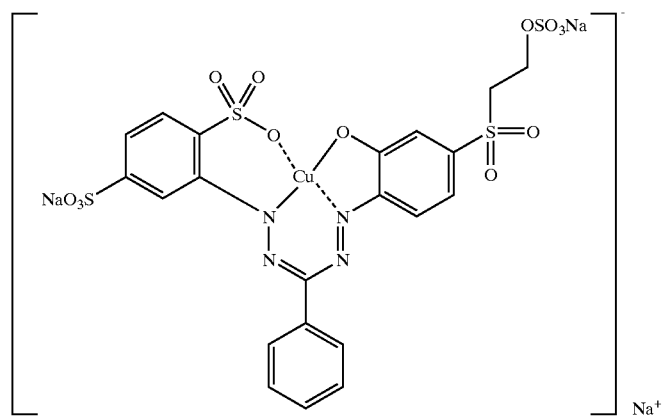
(J)
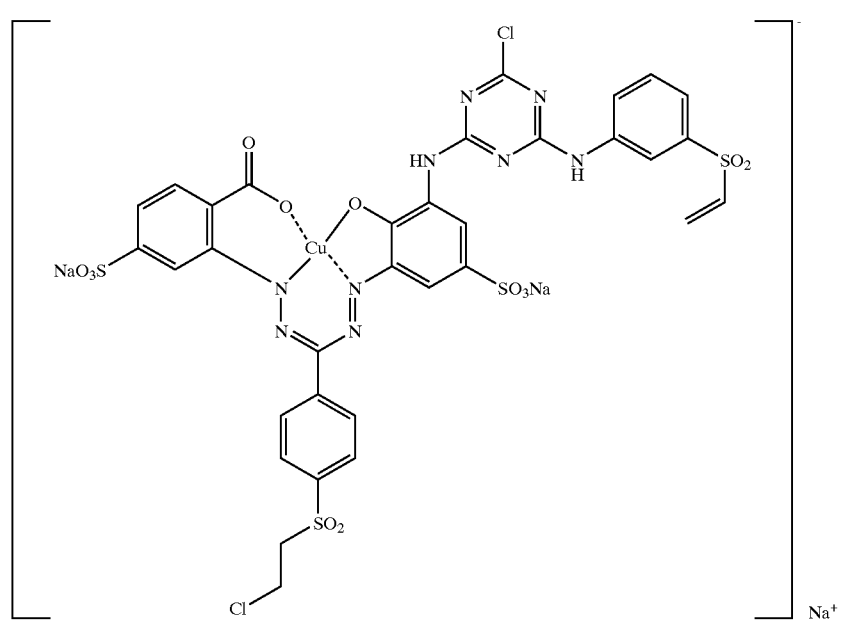
(K)

(L)
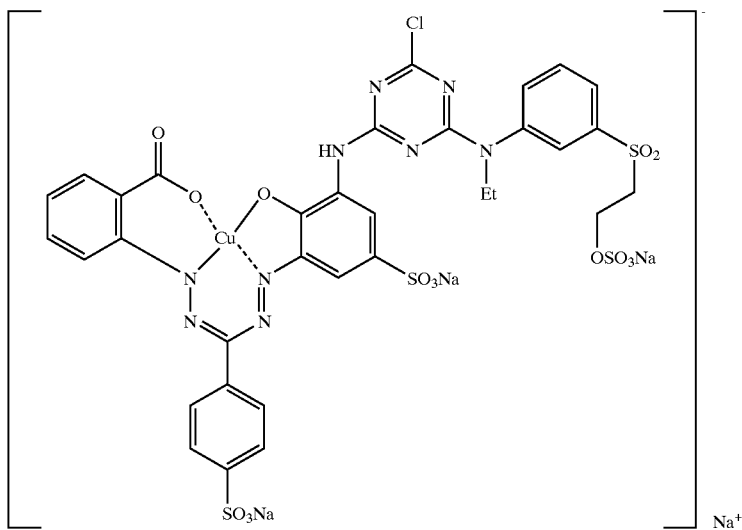
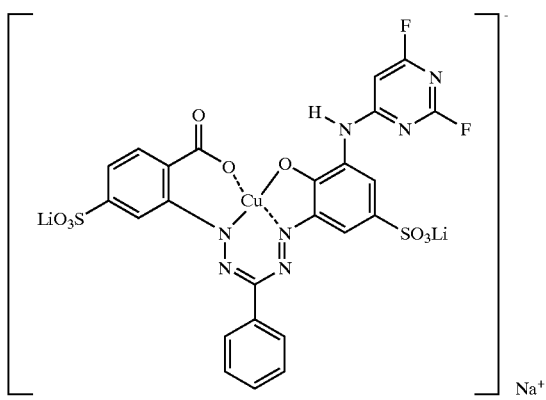
(M)
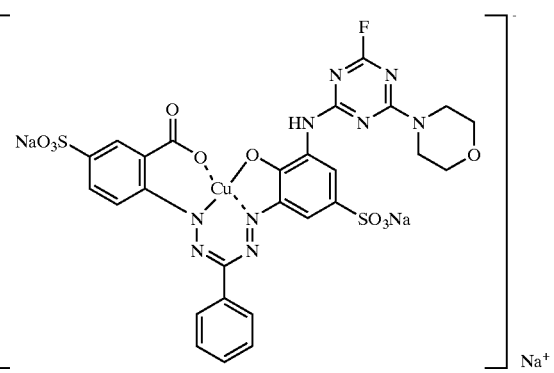
(N)
(O)
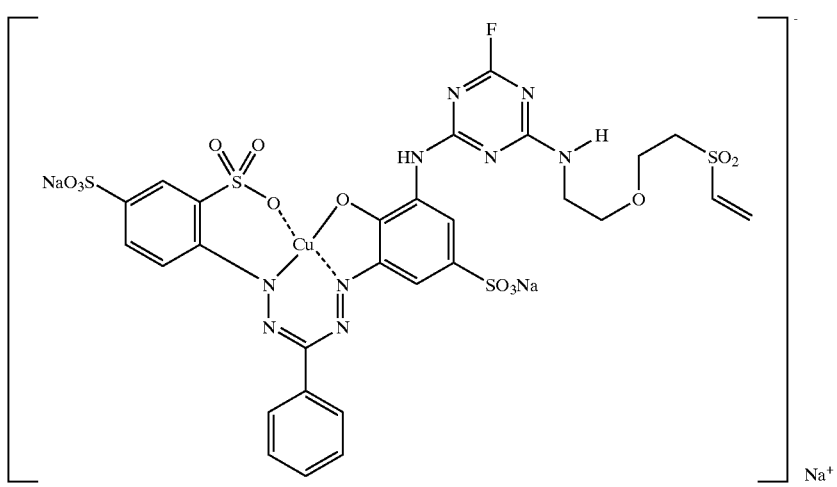

(p)
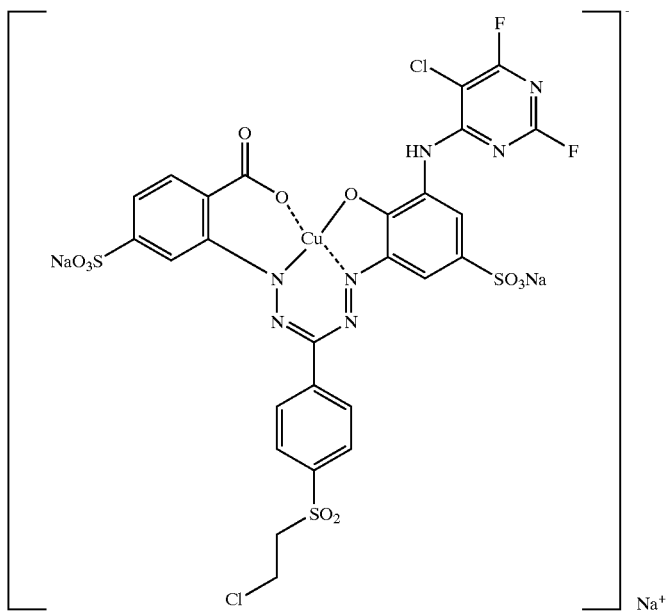
(Q)
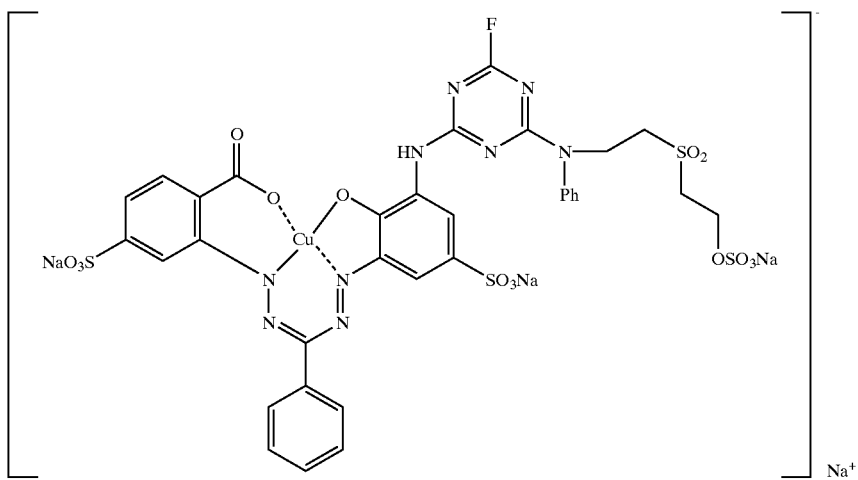
(R)
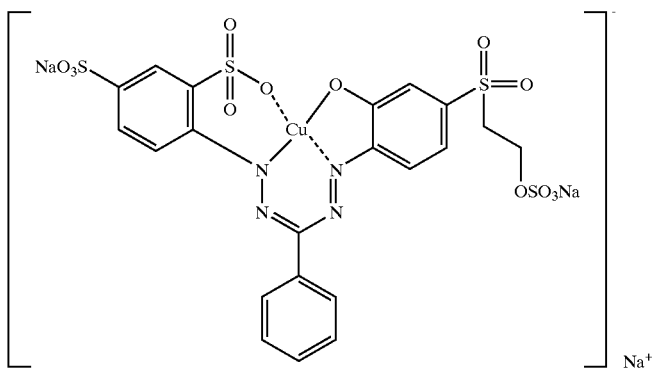

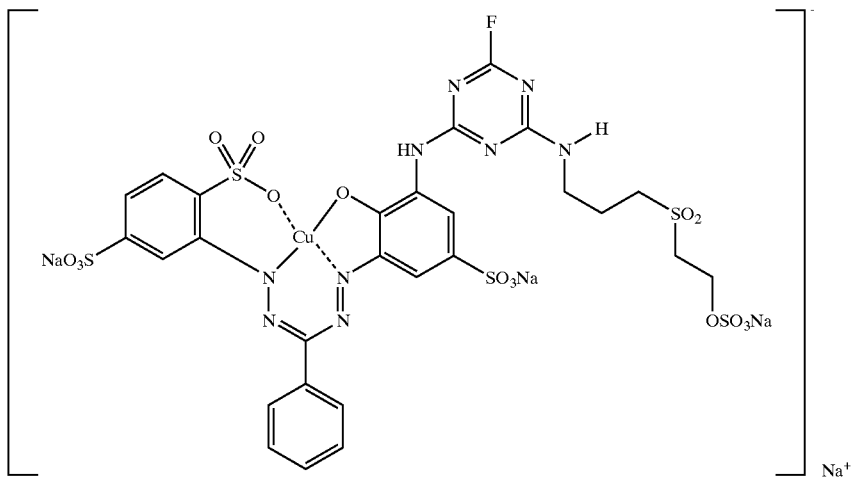
(S)
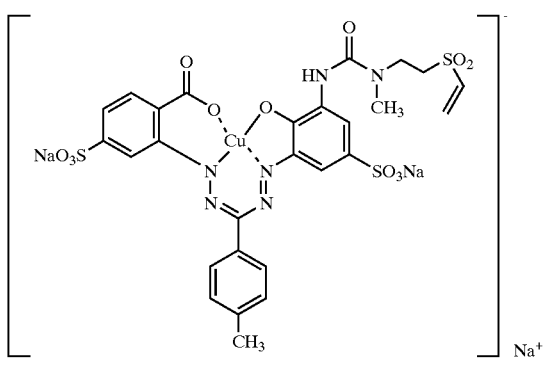
(T)
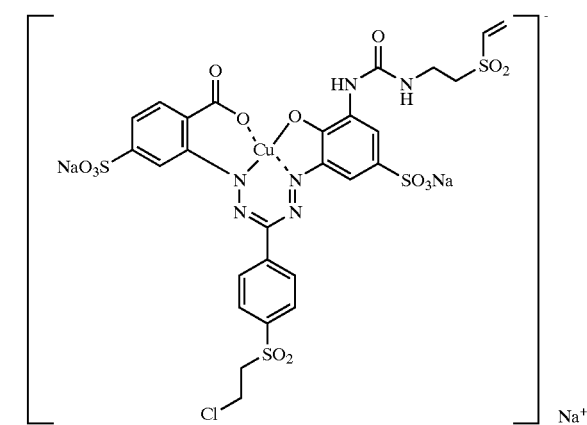
(U)
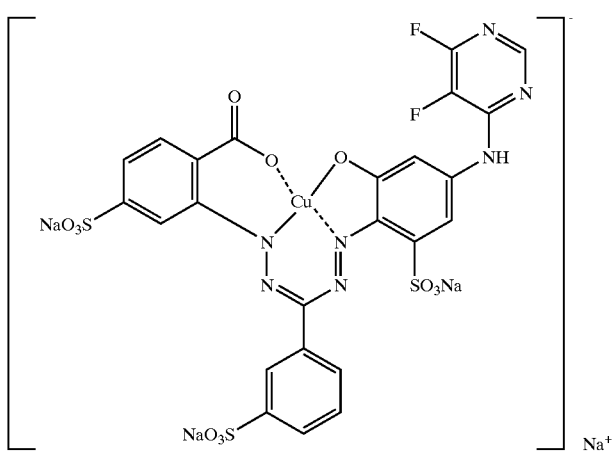
(V)

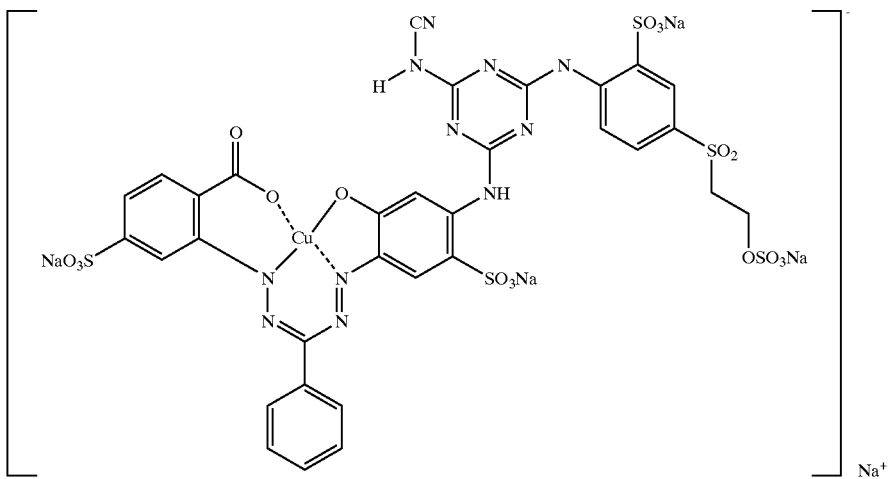
(W)
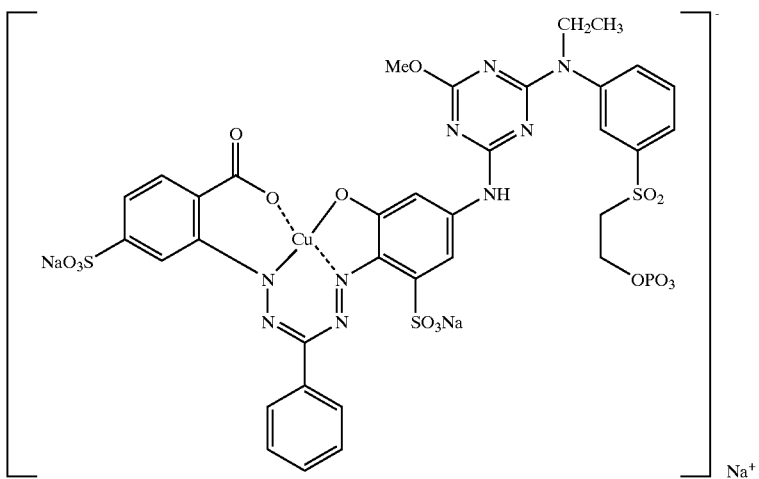
(X)
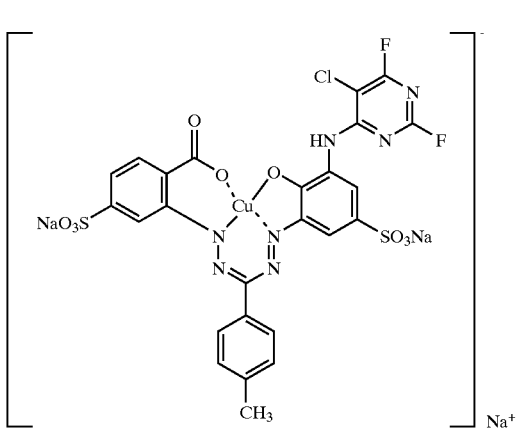
(Y)
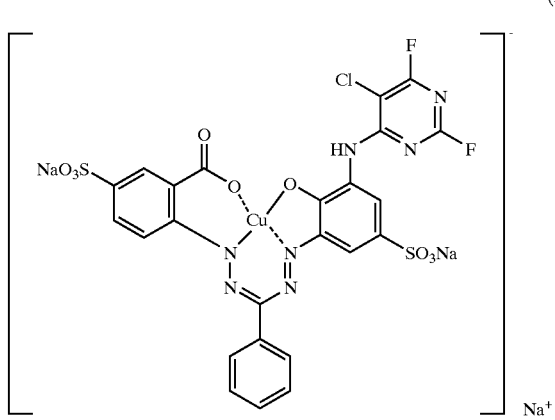
(Z)

Examples 1–162

Dissolving dyes of the formulae A–G and copper formazans of the formulae H–Z in water in accordance with the proportions reported in the table and subsequent isolation by spray drying gave the following mixtures according to the present invention:

| Example | Dye (1) | Dye (2) | Ratio (1):(2) |
|---|---|---|---|
| 1 | C | H | 1:1 |
| 2 | C | I | 1:1 |
| 3 | C | J | 1:1 |
| 4 | C | K | 1:1 |
| 5 | C | L | 1:1 |
| 6 | C | M | 1:1 |
| 7 | C | N | 1.1 |
| 8 | C | O | 1:1 |
| 9 | C | P | 1:1 |
| 10 | C | Q | 1:1 |
| 11 | C | R | 1:1 |
| 12 | C | S | 1:1 |
| 13 | C | T | 1:1 |
| 14 | C | U | 1:1 |
| 15 | C | V | 1:1 |
| 16 | C | X | 1:1 |
| 17 | C | Y | 1:1 |
| 18 | C | Z | 1:1 |
| 19 | C | H | 2:1 |
| 20 | C | I | 2:1 |
| 21 | C | J | 2:1 |
| 22 | C | K | 2:1 |
| 23 | C | L | 2:1 |
| 24 | C | M | 2:1 |
| 25 | C | N | 2:1 |
| 26 | C | O | 2:1 |
| 27 | C | P | 2:1 |
| 28 | C | Q | 2:1 |
| 29 | C | R | 2:1 |
| 30 | C | S | 2:1 |
| 31 | C | T | 2:1 |
| 32 | C | U | 2:1 |
| 33 | C | V | 2:1 |
| 34 | C | X | 2:1 |
| 35 | C | Y | 2:1 |
| 36 | C | Z | 2:1 |
| 37 | C | H | 1:2 |
| 38 | C | I | 1:2 |
| 39 | C | J | 1:2 |
| 40 | C | K | 1:2 |
| 41 | C | L | 1:2 |
| 42 | C | M | 1:2 |
| 43 | C | N | 1.2 |
| 44 | C | O | 1:2 |
| 45 | C | P | 1:2 |
| 46 | C | Q | 1:2 |
| 47 | C | R | 1:2 |
| 48 | C | S | 1:2 |
| 49 | C | T | 1:2 |
| 50 | C | U | 1:2 |
| 51 | C | V | 1:2 |
| 52 | C | X | 1:2 |
| 53 | C | Y | 1:2 |
| 54 | C | Z | 1:2 |
| 55 | B | H | 1:1 |
| 56 | B | I | 1:2 |
| 57 | B | J | 1:1 |
| 58 | B | K | 1:2 |
| 59 | B | L | 1:1 |
| 60 | B | M | 2:1 |
| 61 | B | N | 1:2 |
| 62 | B | O | 2:1 |
| 63 | B | P | 1:1 |
| 64 | B | Q | 2:1 |
| 65 | B | R | 1:2 |
| 66 | B | S | 1:1 |
| 67 | B | T | 2:1 |
| 68 | B | U | 1:1 |
| 69 | B | V | 1:2 |
| 70 | B | X | 1:2 |
| 71 | B | Y | 2:1 |
| 72 | B | Z | 1:2 |
| 73 | A | H | 1:1 |
| 74 | A | H | 2:1 |
| 75 | A | J | 1:1 |
| 76 | A | K | 1:2 |
| 77 | A | L | 1:1 |
| 78 | A | M | 2:1 |
| 79 | A | N | 1:2 |
| 80 | A | O | 2:1 |
| 81 | A | P | 1:1 |
| 82 | A | Q | 2:1 |
| 83 | A | R | 1:2 |
| 84 | A | S | 1:1 |
| 85 | A | T | 2:1 |
| 86 | A | U | 1:1 |
| 87 | A | V | 1:2 |
| 88 | A | X | 1:2 |
| 89 | A | Y | 2:1 |
| 90 | A | Z | 1:2 |
| 91 | D | H | 1:1 |
| 92 | D | I | 1:2 |
| 93 | D | J | 1:1 |
| 94 | D | K | 1:2 |
| 95 | D | L | 1:1 |
| 96 | D | M | 2:1 |
| 97 | D | N | 1:2 |
| 98 | D | O | 2:1 |
| 99 | D | P | 1:1 |
| 100 | D | Q | 2:1 |
| 101 | D | R | 1:2 |
| 102 | D | S | 1:1 |
| 103 | D | T | 2:1 |
| 104 | D | U | 1:1 |
| 105 | D | V | 1:2 |
| 106 | D | X | 1:2 |
| 107 | D | Y | 2:1 |
| 108 | D | Z | 1:2 |
| 109 | E | H | 1:1 |
| 110 | E | I | 1:2 |
| 111 | E | J | 1:1 |
| 112 | E | K | 1:2 |
| 113 | E | L | 1:1 |
| 114 | E | M | 2:1 |
| 115 | E | N | 1:2 |
| 116 | E | O | 2:1 |
| 117 | E | P | 1:1 |
| 118 | E | Q | 2:1 |
| 119 | E | R | 1:2 |
| 120 | E | S | 1:1 |
| 121 | E | T | 2:1 |
| 122 | E | U | 1:1 |
| 123 | E | V | 1:2 |
| 124 | E | X | 1:2 |
| 125 | E | Y | 2:1 |
| 126 | E | Z | 1:2 |
| 127 | F | H | 1:1 |
| 128 | F | I | 1:2 |
| 129 | F | J | 1:1 |
| 130 | F | K | 1:2 |
| 131 | F | L | 1:1 |
| 132 | F | M | 2:1 |
| 133 | F | N | 1:2 |
| 134 | F | O | 2:1 |
| 135 | F | P | 1:1 |
| 136 | F | Q | 2:1 |
| 137 | F | R | 1:2 |
| 138 | F | S | 1:1 |
| 139 | F | T | 2:1 |
| 140 | F | U | 1:1 |
| 141 | F | V | 1:2 |
| 142 | F | X | 1:2 |
| 143 | F | Y | 2:1 |
| 144 | F | Z | 1:2 |
| 145 | G | H | 1:1 |

-continued

| Example | Dye (1) | Dye (2) | Ratio (1):(2) |
|---|---|---|---|
| 146 | G | I | 1:2 |
| 147 | G | J | 1:1 |
| 148 | G | K | 1:2 |
| 149 | G | L | 1:1 |
| 150 | G | M | 2:1 |
| 151 | G | N | 1:2 |
| 152 | G | O | 2:1 |
| 153 | G | P | 1:1 |
| 154 | G | Q | 2:1 |
| 155 | G | R | 1:2 |
| 156 | G | S | 1:1 |
| 157 | G | T | 2:1 |
| 158 | G | U | 1:1 |
| 159 | G | V | 1:2 |
| 160 | G | X | 1:2 |
| 161 | G | Y | 2:1 |
| 162 | G | Z | 1:2 |

Example 163

A mixture of 2 parts of dye A and 1 part of dye H (example 74) was dyed up at various concentrations in a liquor ratio of 10:1 at 60° C. as per the table which follows after normalization for color strength (by use of the different extinction coefficients). The alkali and salt quantities are reported in table 2:

TABLE 2

| Build-up at 60° C. of mixure of dyes A and H | | | | | | | | | |
|---|---|---|---|---|---|---|---|---|---|
| Dyeing | 1 | 2 | 3 | 4 | 5 | 6 | 7 | 8 | 9 |
| Dye % | 0.2 | 0.5 | 1.0 | 2.0 | 3.0 | 4.0 | 6.0 | 8.0 | 10.0 |
| Normalized % | 0.19 | 0.474 | 0.948 | 1.895 | 2.843 | 3.79 | 5.685 | 7.58 | 9.475 |
| NaCl g/l | 30 | 30 | 40 | 50 | 60 | 60 | 80 | 80 | 80 |
| Sodium carbonate g/l | 5 | 5 | 10 | 15 | 20 | 20 | 20 | 20 | 20 |
| NaOH ml/l | | | | | | | | | |
| CDUs | 0.189 | 0.387 | 0.747 | 1.451 | 2.111 | 2.691 | 3.645 | 4.41 | 4.75 |
| Slope | 0.945 | 0.66 | 0.72 | 0.704 | 0.66 | 0.58 | 0.477 | 0.383 | 0.17 |

The color strength of the dyeings obtained, measured in terms of color density units, was plotted in the FIGURE against the respective individual dyeings of the dyes A and H.

It is clearly evident in the FIGURE that the mixture of the dyes A and H surprisingly builds up better than the mathematical average of the individual values of the dyes A and H.

We claim:

1. A dye mixture which comprises dyes of the formula (1) and dyes of the formula (2):

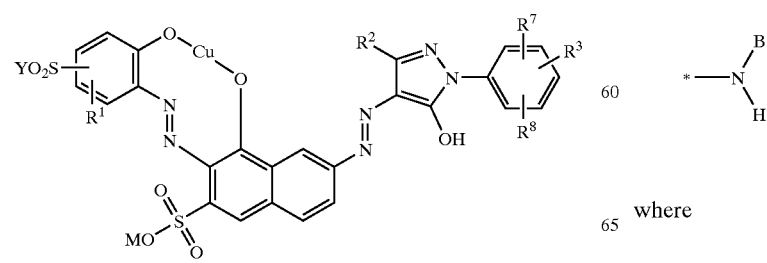

(1)

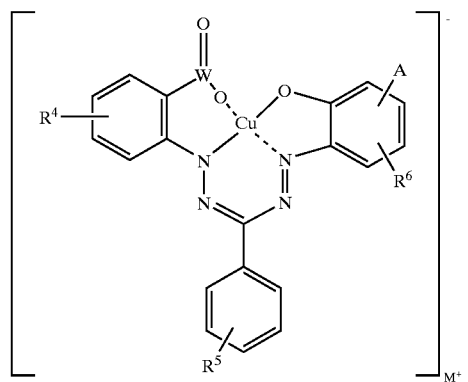

(2)

wherein

M is hydrogen or an alkali metal, an ammonium or the equivalent of an alkaline earth metal ion;

Y is vinyl or is a moiety of the formula $CH_2CH_2Z$, where Z is an alkali-eliminable moiety;

$R^1$ is hydrogen, $C_1$–$C_4$ alkyl, $C_1$–$C_4$ alkoxy, sulfo, bromo or chloro;

$R^2$ is hydrogen, $C_1$–$C_6$-alkyl, carboxyl or carboxyalkyl;

$R^3$ is hydrogen, sulfo or $SO_2Y^1$, where $Y^1$ has one meaning of Y;

$R^4$ is hydrogen or sulfo;

$R^5$ has one meaning of $R^4$ or is methyl, carboxyl or $SO_2Y^2$, where $Y^2$ has one meaning of Y;

$R^6$ has one meaning of $R^4$;

$R^7$ is hydrogen, alkyl, sulfo or chloro;

$R^8$ has one meaning of $R^7$;

W is a carbon or —SO—;

A is a moiety of the formula (3):

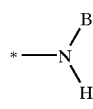

(3)

where

* denotes the bond to formazan and

B is a moeity of the formulae (4), (5), (6) or (7):

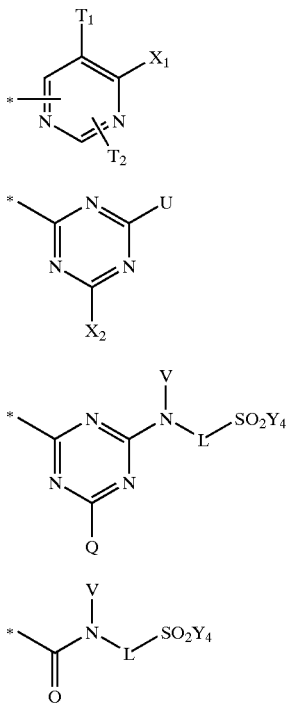

where

* is the bond to N in the formula (3)

U is a 5- or 6-membered N-attached heterocyclic ring which is optionally substituted by a thio, oxo group, or a group of the formula (8):

where

E is hydrogen, unsubstituted $C_1$–$C_4$ alkyl, methoxy-substituted $C_1$–$C_4$ alkyl, hydroxyl-substituted $C_1$–$C_4$ alkyl, sulfato-substituted $C_1$–$C_4$ alkyl, sulfo-substituted $C_1$–$C_4$ alkyl, chloro-substituted $C_1$–$C_4$-alkyl or is phenyl which is optionally substituted by one or 2 substituents selected from the group consisting of chlorine, nitro, acetylamino, sulfo, hydroxyl, carboxyl, $C_1$–$C_4$-alkanoyl, $C_1$–$C_4$-alkoxy and $C_1$–$C_4$-alkyl;

G has one of the meanings of E or is cyano;

L is phenylene or naphthalene which each is optionally substituted by up to two substituents selected from the group consisting of chloro, bromo, hydroxyl, $C_1$–$C_4$-alkoxy, $C_1$–$C_4$-alkyl, sulfo and cyano; or L is $C_2$–$C_6$-alkylene, which is optionally interrupted by 1 to 2 hetero groups;

Q is fluorine, chlorine, $C_1$–$C_4$ alkoxy, cyanamido, amino, $C_1$–$C_4$-alkylamino, dialkylamino, piperazine, morpholine or a group of the formula (9a) or (9b);

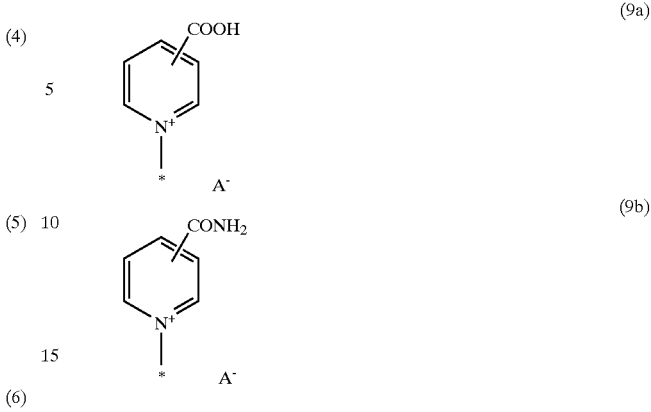

where $A^-$ is fluoride, chloride or the equivalent of a sulfate ion;

V has one of the meanings of E;

$T^1$ is hydrogen, fluorine or chlorine;

$T^2$ is hydrogen, fluorine or chlorine, subject to the proviso that $T^1$ and $T^2$ are not both hydrogen;

$X^1$ is fluorine or chlorine; and $X^2$ has one meaning of $X^1$.

2. The dye mixture as claimed in claim 1, wherein:

Z is chloro, acetyl, phosphato or thiosulfato;

$R^1$ is hydrogen, methyl, ethyl, n-propyl, i-propyl, n-butyl, i-butyl, sec-butyl, methoxy, ethoxy, propyloxy or butyloxy;

$R^2$ is hydrogen, methyl, ethyl, n-propyl, i-propyl, n-butyl, i-butyl, sec-butyl, pentyl, hexyl or carboxymethyl;

L is phenylene or naphthalene which each is optionally substituted by up to two substituents selected from the group consisting of chloro, bromo, hydroxyl, methoxy, methyl, ethyl, sulfo and cyano; or L is $C_2$–$C_6$-alkylene, which is optioinally interrupted by 1 to 2 hetero groups which is selected from the group consisting of oxo, thio, amino and $C_1$–$C_4$-alkyl amino.

3. The dye mixture as claimed in claim 1, wherein one or more azo dyes conforming to the formula (1) and one or more formazan dyes conforming to the formula (2) are present in a mixing ratio of 90:10% by weight to 10:90% by weight.

4. The dye mixture as claimed in claim 1, wherein one or more azo dyes conforming to the formula (1) and one or more formazan dyes conforming to the formula (2) are present in a mixing ratio of 70:30% by weight to 30:70% by weight.

5. The dye mixture as claimed in claim 2, wherein one or more azo dyes conforming to the formula (1) and one or more formazan dyes conforming to the formula (2) are present in a mixing ratio of 70:30% by weight to 30:70% by weight.

6. A process for preparing the dye mixture as claimed in claim 1 which comprises mechanically mixing the individual dyes of the formula (1) and (2), which are present in solid or in liquid form.

7. A process for preparing the dye mixture as claimed in claim 5 which comprises mechanically mixing the individual dyes of the formula (1) and (2), which are present in solid or in liquid form.

8. A process for dyeing or printing hydroxyl- and/or carboxamido-containing material, by applying the dye mixture as claimed in claim 1 in dissolved form to the material and fixing the dye mixture on the material by means of heat, with the aid of an alkaline agent or by means heat and with the aid of an alkaline agent.

9. The process as claimed in claim 8 wherein the material is a fiber material.

10. The dye mixture as claimed in claim 1 wherein:
Z is sulfato;
$R^1$ is methyl or methoxy;
$R^2$ is carboxyl or methyl;
$R^5$ is hydrogen, sulfo, methyl, carboxyl or $SO_2Y^2$ wherein $Y^2$ is $CH_2CH_2Cl$;
U is morpholine or is a group of the formula (8);
G is hydrogen;
L is phenylene, ethylene, propylene or 3-oxopentylene; and
V is hydrogen, methyl, phenyl or sulfophenyl.

11. The dye mixture according to claim 10 wherein one or more azo dyes conforming to the formula (1) and one or more formazan dyes conforming to the formula (2) are present in the mixing ratio of 65:35 to 35:65 percent by weight.

12. The process according to claim 8 wherein the hydroxy-containing material is cotton, linen, hemp, jute, ramie fiber or regenerated cellulose fiber.

13. The process as claimed in claim 8 wherein the carboxamino-containing material is wool; silk; leather; nylon-6,6; nylon-6; nylon-11 or nylon-4.

14. A dye mixture which comprises dyes of the formula (1) and dyes of the formula (2):

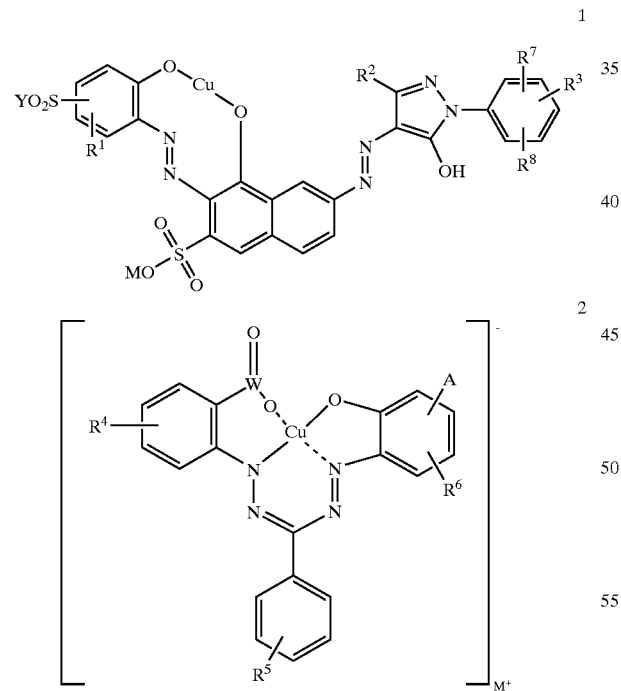

wherein:
M is hydrogen or an alkali metal, an ammonium or the equivalent of an alkaline earth metal ion;
Y is vinyl or is a moiety of the formula $CH_2CH_2Z$, where Z is an alkali-eliminable moiety;
$R^1$ is hydrogen, $C_1$–$C_4$ alkyl, sulfo, bromo or chloro;
$R^2$ is hydrogen, $C_1$–$C_6$-alkyl, carboxyl or carboxyalkyl;
$R^3$ is hydrogen, sulfo or $SO_2Y^1$, where $Y^1$ has one meaning of Y;
$R^4$ is hydrogen or sulfo;
$R^5$ has one meaning of $R^4$ or is methyl, carboxyl or $SO_2Y^2$, where $Y^2$ has one meaning of Y;
$R^6$ has one meaning of $R^4$;
$R^7$ is hydrogen, alkyl, sulfo or chloro;
$R^8$ has one meaning of $R^7$;
W is a carbon or —SO—;
A is $SO_2Y^3$, where $Y^3$ has one meaning of Y, or else A is a moiety of the formula (3):

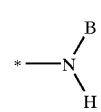 (3)

where
* denotes the bond to formazan and
B is a moeity of the formulae (4), (5), (6) or (7):

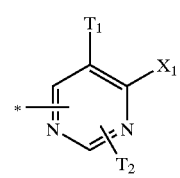 (4)

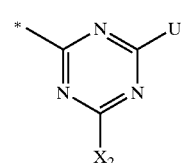 (5)

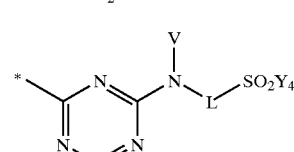 (6)

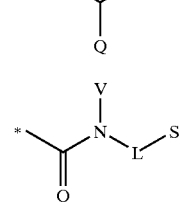 (7)

where
* is the bond to N in the formula (3)
U is a 5- or 6-membered N-attached heterocyclic ring which is optionally substituted by a thio, oxo group, or a group of the formula (8):

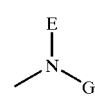 (8)

where
E is hydrogen, unsubstituted $C_1$–$C_4$ alkyl, methoxy-substituted $C_1$–$C_4$ alkyl, hydroxyl-substituted $C_1$–$C_4$ alkyl, sulfato-substituted $C_1$–$C_4$ alkyl, sulfo-substituted $C_1$–$C_4$ alkyl, chloro-substituted $C_1$–$C_4$-alkyl or is phenyl which is optionally substituted by one or 2 substituents selected from the group consisting of chlorine, nitro, acetylamino, sulfo, hydroxyl, carboxyl, $C_1$–$C_4$-alkanoyl, $C_1$–$C_4$-alkoxy and $C_1$–$C_4$-alkyl;

G has one of the meanings of E or is cyano;

L is phenylene or naphthyl which each is optionally substituted by up to two substituents selected from the group consisting of chloro, bromo, hydroxyl, $C_1$–$C_4$-alkoxy, $C_1$–$C_4$-alkyl, sulfo and cyano; or L is $C_2$–$C_6$-alkylene, which is optionally interrupted by 1 to 2 hetero groups;

Q is fluorine, chlorine, $C_1$–$C_4$alkoxy, cyanamido, amino, $C_1$–$C_4$-alkylamino, dialkylamino, piperazine, morpholine or a group of the formula (9a) or (9b):

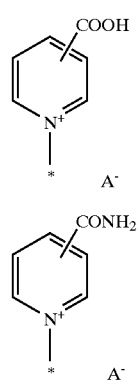

(9a)

(9b)

where A⁻ is fluoride, chloride or the equivalent of a sulfate ion;

V has one of the meanings of E;

$T^1$ is hydrogen, fluorine or chlorine;

$T^2$ is hydrogen, fluorine or chlorine, subject to the proviso that $T^1$ and $T^2$ are not both hydrogen;

$X^1$ is fluorine or chlorine; and $X^2$ has one meaning of $X^1$.

15. The dye mixture as claimed in claim 14, wherein

Z is chloro, acetyl, phosphato or thiosulfato;

$R^1$ is hydrogen, methyl, ethyl, n-propyl, i-propyl, n-butyl, i-butyl, sec-butyl;

$R^2$ is hydrogen, methyl, ethyl, n-propyl, i-propyl, n-butyl, i-butyl, sec-butyl, pentyl, hexyl or carboxymethyl;

L is phenylene or naphthyl which each is optionally substituted by up to two substituents selected from the group consisting of chloro, bromo, hydroxyl, methoxy, methyl, ethyl, sulfo and cyano; or L is $C_2$–$C_6$-alkylene, which is optionally interrupted by 1 to 2 hetero groups which is selected from the group consisting of oxo, thio, amino and $C_1$–$C_4$-alkyl amino.

16. The dye mixture as claimed in claim 14, wherein one or more azo dyes conforming to the formula (1) and one or more formazan dyes conforming to the formula (2) are present in a mixing ratio of 90:10% by weight to 10:90% by weight.

17. The dye mixture as claimed in claim 14, wherein one or more azo dyes conforming to the formula (1) and one or more formazan dyes conforming to the formula (2) are present in a mixing ratio of 70:30% by weight to 30:70% by weight.

18. The dye mixture as claimed in claim 15, wherein one or more azo dyes conforming to the formula (1) and one or more formazan dyes conforming to the formula (2) are present in a mixing ratio of 70:30% by weight to 30:70% by weight.

19. A process for preparing the dye mixture as claimed in claim 14 which comprises mechanically mixing the individual dyes of the formula (1) and (2), which are present in solid or in liquid form.

20. A process for preparing the dye mixture as claimed in claim 18 which comprises mechanically mixing the individual dyes of the formula (1) and (2), which are present in solid or in liquid form.

21. A process for dyeing or printing hydroxyl- and/or carboxamido-containing material, by applying the dye mixture as claimed in claim 14 dissolved form to the material and fixing the dye mixture on the material by means of heat, with the aid of an alkaline agent or by means heat and with the aid of an alkaline agent.

22. The process as claimed in claim 21, wherein the material is a fiber material.

23. The dye mixture as claimed in claim 14, wherein:

Z is sulfato;

$R^1$ is methyl;

$R^2$ is carboxyl or methyl;

$R^5$ is hydrogen, sulfo, methyl, carboxyl or $SO_2Y^2$ wherein $Y^2$ is $CH_2CH_2Cl$;

U is morpholine or is a group of the formula (8);

G is hydrogen;

L is phenylene, ethylene, propylene or 3-oxopentylene; and

V is hydrogen, methyl, phenyl or sulfophenyl.

24. The dye mixture according to claim 23 wherein one or more azo dyes conforming to the formula (1) and one or more formazan dyes conforming to the formula (2) are present in the mixing ratio of 65:35 to 35:65 percent by weight.

25. The process according to claim 21 wherein the hydroxy-containing material is cotton, linen, hemp, jute, ramie fiber or regenerated cellulose fiber.

26. The process as claimed in claim 21 wherein the carboxamino-containing material is wool; silk; leather; nylon-6,6; nylon-6; nylon-11 or nylon-4.

\* \* \* \* \*

UNITED STATES PATENT AND TRADEMARK OFFICE
CERTIFICATE OF CORRECTION

PATENT NO. : 6,991,661 B2
APPLICATION NO. : 10/343263
DATED : January 31, 2006
INVENTOR(S) : Joachim Steckelberg et al.

It is certified that error appears in the above-identified patent and that said Letters Patent is hereby corrected as shown below:

On the Front Page:

(75) Inventors: "Joachim Steckelberg, Brunsbüttel (DE); Christian Schumacher Kelkheim (DE)"

should read

-- (75) Inventors: Joachim Steckelberg, Brunsbüttel (DE); Christian Schumacher Kelkheim (DE), Erol Özcan, Istanbul Caddesi (TR)--

In the Claims:

In Claim 21, at column 36, line 26, "as claimed in claim 14 dissolved form to the material" should read -- as claimed in claim 14 in dissolved form to the material--

Signed and Sealed this

First Day of August, 2006

JON W. DUDAS
*Director of the United States Patent and Trademark Office*